United States Patent [19]

Wernicke

[11] Patent Number: 4,913,317
[45] Date of Patent: Apr. 3, 1990

[54] FOAM DISPENSING APPARATUS

[75] Inventor: Steven A. Wernicke, Wheaton, Ill.

[73] Assignee: Foamtek, Inc., Batavia, Ill.

[21] Appl. No.: 244,812

[22] Filed: Sep. 14, 1988

[51] Int. Cl.⁴ .............................................. B67D 5/60
[52] U.S. Cl. ............................................ 222/1; 222/639;
222/145; 222/148; 239/112; 239/414
[58] Field of Search ................. 222/1, 639, 642, 644,
222/3-4, 132, 135-136, 144.5, 145, 148, 394,
504; 239/104, 106, 112, 390, 398, 412-414

[56] References Cited

U.S. PATENT DOCUMENTS

| | | | |
|---|---|---|---|
| 3,129,777 | 4/1964 | Haspert | 175/340 |
| 3,249,304 | 5/1966 | Faro et al. | 239/10 |
| 3,723,851 | 3/1973 | Johnson et al. | 222/132 |
| 3,754,683 | 8/1973 | Broadfoot | 222/134 |
| 3,888,420 | 6/1975 | Boelkins | 239/412 |
| 3,913,790 | 10/1975 | Seidel | 222/132 |
| 3,945,533 | 3/1976 | Otto | 222/639 |
| 4,023,733 | 5/1977 | Sperry | 239/112 |
| 4,174,049 | 11/1979 | Bolen | 222/5 |
| 4,262,847 | 4/1981 | Stitzer et al. | 239/112 |
| 4,262,848 | 4/1981 | Chabria | 239/112 |
| 4,325,513 | 4/1982 | Smith et al. | 239/112 |
| 4,399,930 | 8/1983 | Harding | 222/145 |
| 4,440,320 | 4/1984 | Wernicke | 222/145 |
| 4,458,831 | 7/1984 | Holleran et al. | 222/134 |
| 4,469,251 | 9/1984 | Sperry et al. | 222/135 |
| 4,471,887 | 9/1984 | Decker | 222/135 |
| 4,537,355 | 8/1985 | Calder | 239/119 |
| 4,538,763 | 9/1985 | Perry et al. | 239/600 |
| 4,550,863 | 11/1985 | Farrey | 222/145 |
| 4,568,003 | 2/1986 | Sperry et al. | 222/145 |
| 4,778,083 | 10/1988 | Decker | 222/144.5 |

Primary Examiner—Michael S. Huppert
Attorney, Agent, or Firm—Leydig, Voit & Mayer

[57] ABSTRACT

A foam dispenser for converting a plurality of foam components into an expanded foam that can be cleaned with compressed gas after the foam is discharged and which is distinguished by the use of a center plug having discrete passages to separate the various foam components until the components enter a detachable mixing chamber located external to the dispenser barrel.

12 Claims, 3 Drawing Sheets

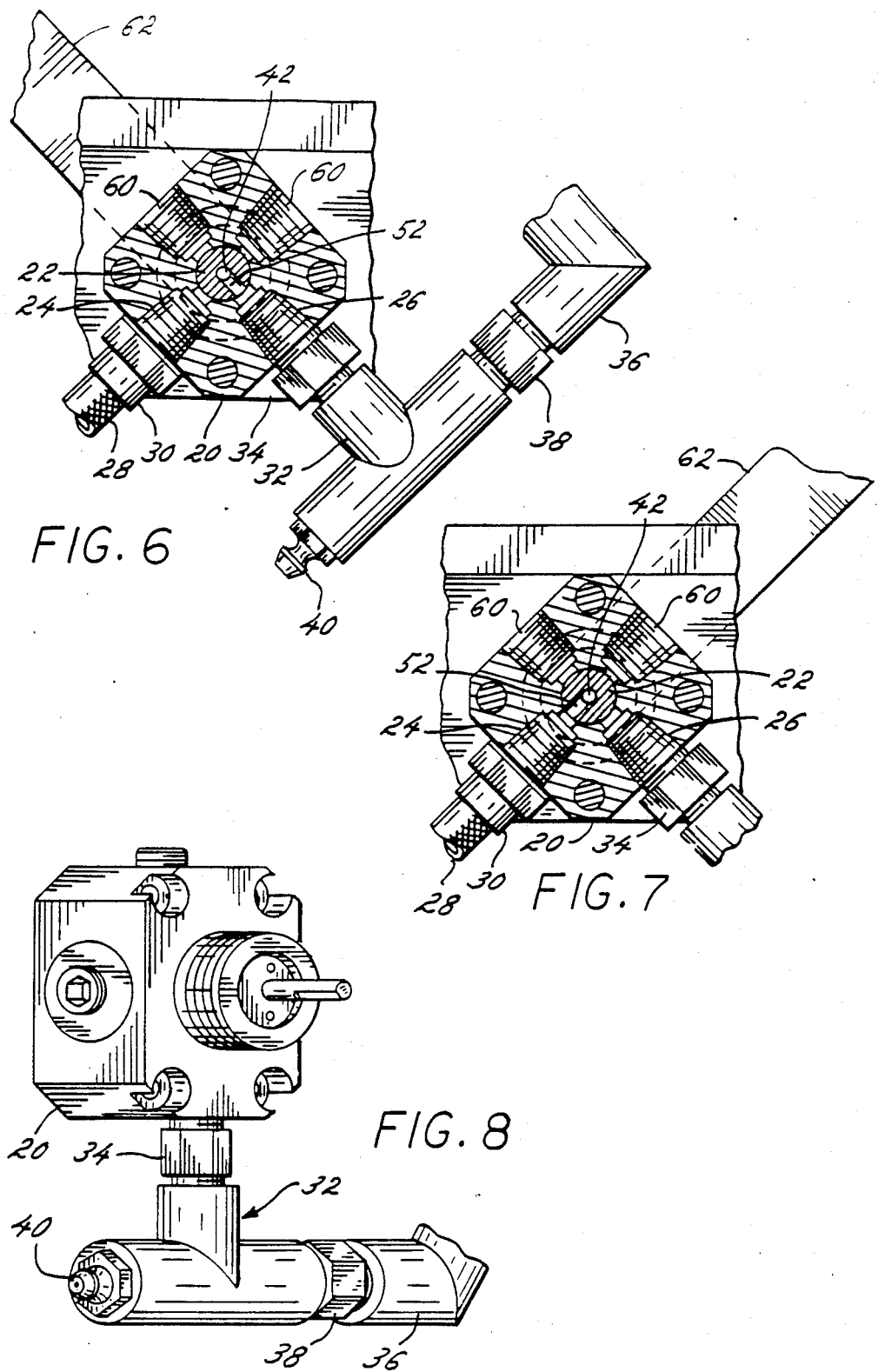

FOAM DISPENSING APPARATUS

FIELD OF THE INVENTION

This invention relates to the dispensing of expanding foams and, more particularly, to an improved foam dispensing gun.

BACKGROUND OF THE INVENTION

Various foam dispensing devices have been proposed and used for mixing and expanding isocyanate, polyol and other foam components into polyurethane foam. When these components are mixed in proper proportions, they typically react quickly to form and solidify into an expanded foam. Component parts of the foam can also begin to solidify by reacting with moisture available in the air. Foam dispensing devices must, therefore, be kept free from buildup of the foam components and resulting expanded foam so that control valves and passageways do not become clogged, rendering the device inoperable and useless.

Certain prior foam dispensing devices required dismantling after each application in order to clean the dispenser. Most foam dispensers of recent design have utilized integral means for cleaning purposes, with a solvent being introduced to the dispenser after its use to flush the expanded foam and unreacted components therefrom. However, experience with apparatus of this general nature has shown that adequate cleaning is not always provided.

Other prior art dispensing devices, such as those disclosed in U.S. Pat. No. 4,469,251 to Sperry et al., and U.S. Pat. No. 4,399,930 to Harding, disclose the use of detachable, disposable mixing chambers. It does not appear, however, that these mixing chambers can be cleaned and reused if desired. Further, it does not appear that the design of these dispensers allows the substitution and use of mixing chambers of varying sizes.

The expanded foams generated by the foregoing apparatus are commonly used for insulation in, for example, refrigerator shells. Such shells require a fixed volume of foam —too much foam will split the shell; too little, and the shell will not be adequately insulated. The foam dispensing guns of the prior art, however, such as those disclosed in U.S. Pat. No. 4,469,251 to Sperry et al. and U.S. Pat. No. 4,399,930 to Harding, are not deemed to include sufficient means to enable a user to consistently dispense an identical volume of foam with each use of the dispenser.

The above-noted deficiencies were addressed in my U.S. Pat. No. 4,440,320, which is incorporated herein by reference. U.S. Pat. No. 4,440,320 discloses a foam dispensing apparatus having an improved valve arrangement for controlling the flow of the foam components through the dispenser so that the valves, passageways and the mixing chamber may be readily cleaned without disassembly, thus permitting the apparatus to be kept in operative condition at all times. The foam dispenser disclosed in my U.S. Pat. No. 4,440,320 also has a valve system which is capable of timed actuation, to allow only a predetermined amount of expanded foam to be produced.

To clean the foam dispenser disclosed in my U.S. Pat. No. 4,440,320, a solvent must be introduced into the dispenser after use to flush the expanded foam and unreacted components therefrom. Solvents useful for this purpose are generally toxic and/or flammable, and can pose both health and fire hazards in their use and disposal. These drawbacks make the use of a solvent undesirable to many users of foam dispensing apparatus.

OBJECTS AND SUMMARY OF THE INVENTION

It is therefore an object of the present invention to provide a foam dispensing apparatus of relatively simple construction which may be readily cleaned after use without the use of a solvent.

A related and more specific object is to provide a foam dispensing apparatus having a center plug to keep the foam components separate until they pass through into a separate mixing chamber.

A further object lies in the provision of a foam dispensing apparatus having an external mixing chamber which can be easily removed for cleaning and/or to substitute a different type of chamber for various applications.

BRIEF DESCRIPTION OF THE DRAWINGS

These and other objects and advantages of the invention will become more readily apparent upon reading the following detailed description and upon reference to the accompanying drawings wherein:

FIG. 6 is a cross-sectional view taken along line 6—6 of FIG. 1, showing the position of the valves when compressed air is being admitted to the dispenser and illustrating, in accordance with another exemplary embodiment of the present invention, the attachment of a pipe tee, including a check valve and zert fitting, to the compressed gas tube;

FIG. 7 is a cross-sectional view similar to FIG. 6 showing the position of the valves when the foam components are being admitted to the dispenser; and FIG. 8 is an exploded isometric view illustrating the construction of the valves and the pipe tee, zert fitting and check valve.

While the invention will be describe disclosed in connection with certain preferred embodiments and procedures, it is not intended to limit the invention to those specific embodiments. Rather, it is intended to cover all such alternative embodiments and modifications as fall within the spirit and scope of the invention. For example, although the present invention will be described as a dispenser for polyurethane foam, the dispensing apparatus of the present invention is also useful for dispensing other types of chemicals, as will be readily apparent to those skilled in the art.

DETAILED DESCRIPTION OF THE PREFERRED EMBODIMENTS

The foam dispenser of the present invention includes a barrel having a plurality of passages which allow communication between a center plug and the fluid foam components and compressed gas. The center plug has discrete passages for each of the foam components. A detachable mixing chamber is connected to the center plug at the end of the barrel and communicates therewith to provide a chamber for the various foam components to meet and react to form the expanded foam. A nozzle is connected to the end of the mixing chamber and provides an opening for discharging the expanded foam from the dispenser. A rotary valve structure for each principal foam component is provided, each having a single passageway formed therethrough to permit the introduction of either the foam component or the compressed gas through the valve and into the center plug.

The passageway for each valve is in communication with a passageway in the center plug and can move between a position in which either a foam component or compressed gas is admitted into the gun. Each valve is provided with a tube for carrying the foam component to the dispenser, each such tube having a corresponding tube for carrying the compressed gas. The distance between the point where the supply tubes are attached to the dispenser and the valves is short so that, after the valves are rotated to flush the dispenser with compressed gas, no significant amount of film components builds up in the dispenser during normal usage. In a preferred embodiment, the compressed gas tubes communicate with the rotary valve via a pipe tee. The pipe tee has a zert fitting and a check valve, the check valve being situated at the interface of the pipe tee and the compressed gas tube.

Figure 1:
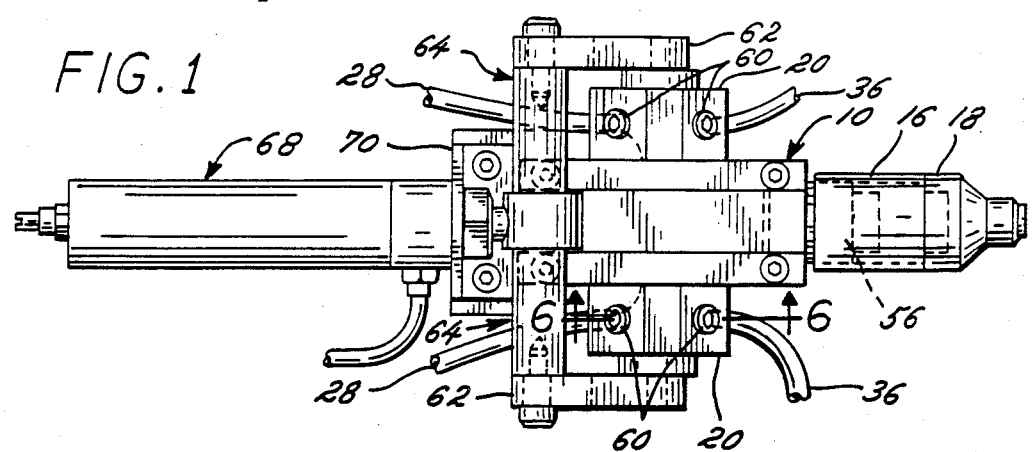
FIG. 1 is a top view of a foam dispensing apparatus in accordance with an exemplary embodiment of the present invention and illustrating the dispenser with the valves being positioned so that compressed gas is being admitted into the dispenser.
Figure 2:
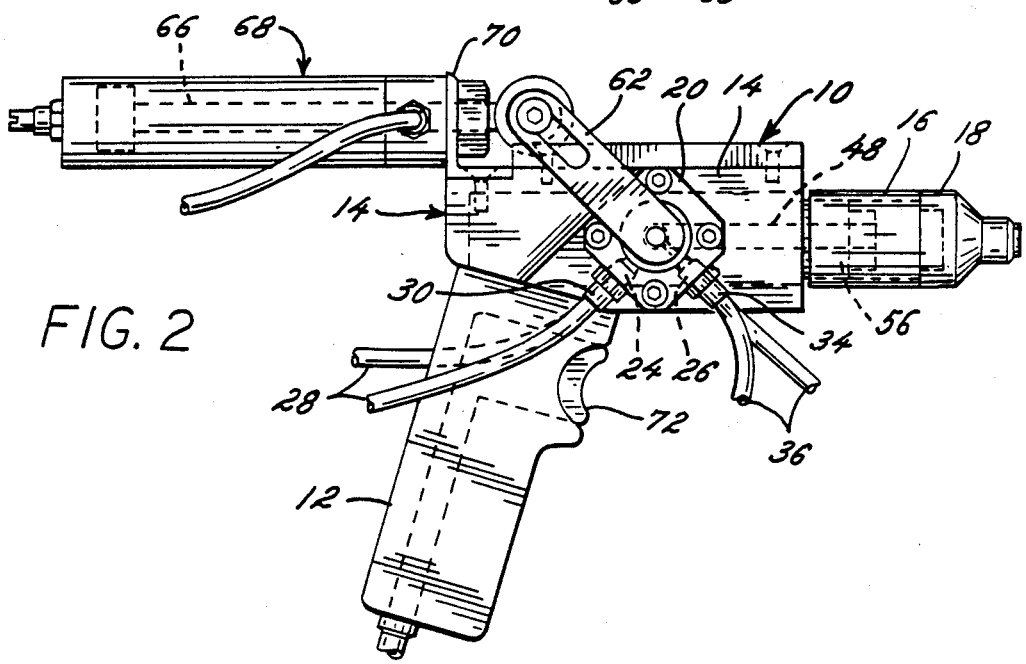
FIG. 2 is a side elevation view of the foam dispenser of FIG. 1.

Turning now to the drawings, FIGS. 1 and 2 show generally a hand-held foam dispenser 10, having a handle 12 and a barrel 14. A mixing chamber 16 is attached to the end of the barrel and has a nozzle 18, with a passageway for discharging the expanded foam. Bosses 20 are affixed on opposite sides of the barrel 14. Each boss 20 carries a rotary valve, generally indicated by 22, as shown in FIGS. 6 and 7. A rotary valve is provided for each different fluid component required to make the expanded foam. Although generally only two principal components are required—a polyol blend and an isocyanate blend—thus necessitating only two valves 22, it is not intended that this invention be limited to the use of such components, or to an embodiment having only two valves. It should likewise be appreciated that additional foam components can be added to the polyol and isocyanate constituents if desired by the user.

The foam components and compressed gas sources are connected to the dispenser by separate attachment means. Thus, as shown, each boss 20 has two internally threaded ports 24 and 26 as shown in FIGS. 6 and 7. A conduit 28, which can be a flexible tube, is affixed to each foam component port 24. Tube 28 is removably secured to port 24 by a coupling 30, whose external threads cooperate with the internal threads of the port. While the compressed gas port 26 may also be connected to a conduit 36 by a coupling 34 (FIGS. 1 and 2), in the preferred embodiment, compressed gas port 26 is attached a pipe tee 32, which is attached to the port by a coupling 34. The coupling 34 has external threads which cooperate with the internal threads of the port 26, and internal threads that cooperate with the external threads of pipe tee 32. One end of pipe tee 32 is connected to a conduit 36, which can be a flexible tube. Tube 36 communicates with pipe tee 32 via check valve 38. A zert fitting 40, or other suitable one-way valve for the introduction of a substance into the system, is located at the end of the pipe tee 32 opposite the check valve 38. The zert fitting 40 allows the user to clean out foam components hydraulically from the pathways of the dispenser. It also seals any trace residue from the air, eliminating unwanted phenomenon such as film formation in the center plug or in the valve 22. The check valve 38 is provided to prevent the foam components or purging medium from entering the compressed gas tube 36 during cleaning.

Tubes 28 and 36 leads to sources of pressurized fluid foam components and compressed gas, respectively (not shown). The admittance of the fluid foam components and the compressed gas from their respective supply sources into the tubes may be regulated by a valve between the tube and the supply source which is readily accessible to the operator of the foam dispenser. Suitable supply sources for the fluid foam components such as drums and the like are well known and may be employed. Such sources of foam components include 15 to 8,000 gallon cylinders pressurized by applying pressurized nitrogen, supplied through a regulator, to the top of each cylinder. Pressurized fluids can also be supplied by a pumping device. Likewise, compressed air may be provided via a pressurized tank.

Figure 5:
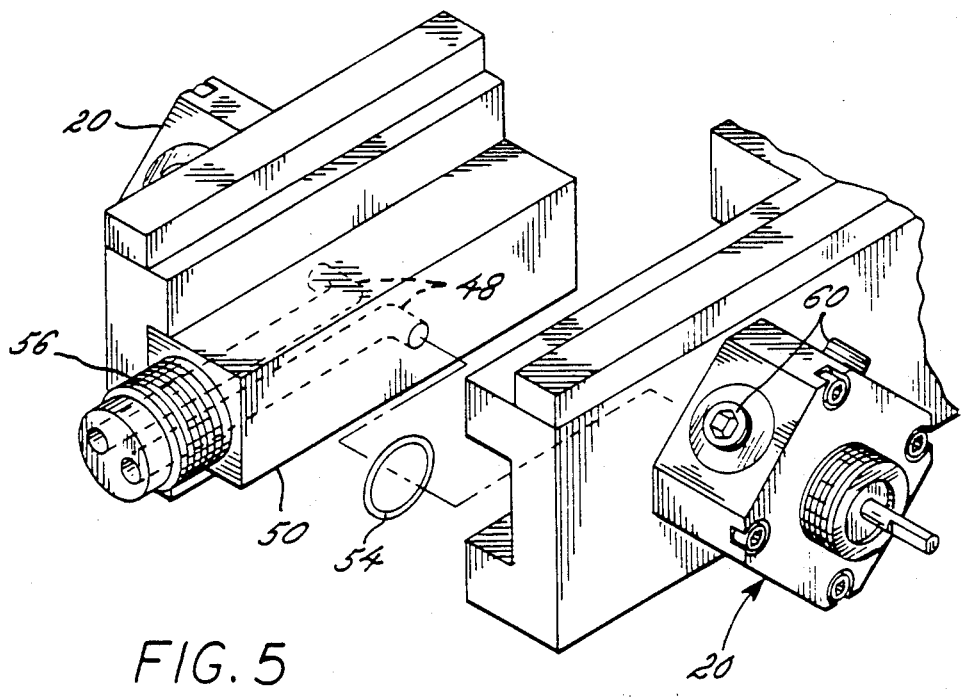
FIG. 5 is an exploded isometric view of the barrel of the foam dispenser, which illustrates the center plug of the dispenser.

FIG. 5 illustrates the valves 22. Each valve has a single L-shaped passageway 42 with an outlet 44, which communicates through passage 46 with discrete passages 48 in center plug 50. Passageway 42 also has an inlet 52, which alternately rotates between communication with tube 28 when foam is to be dispensed, and with pipe tee 32 when the apparatus is to be cleaned with compressed gas following the completion of a foam-dispensing operation.

As best shown in FIG. 5, it is a particular feature of the invention that the center plug 50 has discrete passages 48 for each fluid foam component. Thus, the foam components do not mix and react to form expanded foam until they enter the mixing chamber (not shown), which is outside the gun barrel. As a result, the gun body center plug may be easily cleaned by the use of compressed gas. If desired, the center plug may also be removed from the dispenser for manual cleaning. An O-ring 54 is used to provide a seal between the gun body center plug 50 and valve 22. Threads 56 may be used to connect the outer end of the center plug 50 to the mixing chamber 16 (FIG. 1). Although the center plug may be of any shape, it is preferably rectangular so that it does not rotate when mixing chamber 16 is threaded onto threads 56.

Figure 3:
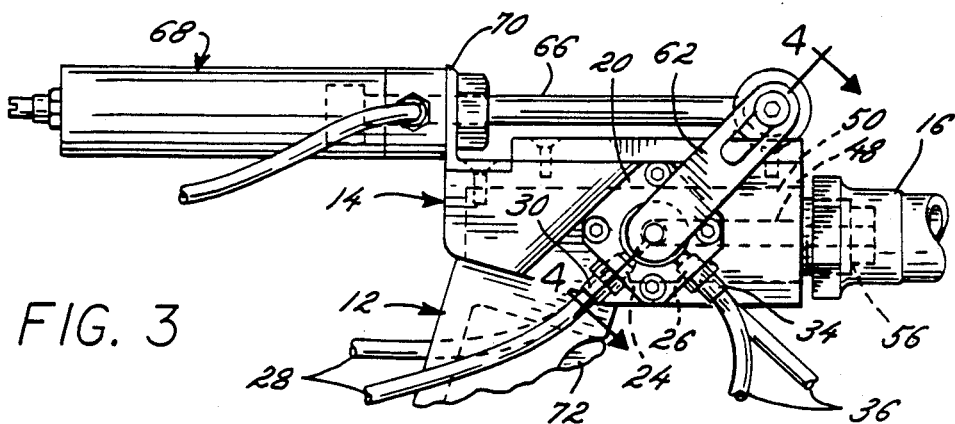
FIG. 3 is a side elevation view of the foam dispenser of FIG. 1, with the valves being positioned so that the components of the foam are being admitted into the dispenser, and illustrates, in accordance with another exemplary embodiment of the present invention, the use of a plastic tube containing mixing elements as the mixing chamber.

The mixing chamber 16 is preferably of a disposable type which can be discarded after use or cleaned several times without detachment via compressed gas. Since the mixing chamber 16 is located outside the barrel 14, it can be removed from center plug 50 without the necessity of disassembling the dispenser, thus facilitating easy removal of the mixing chamber 16 for manual cleaning or replacement. As shown in FIG. 3, the mixing chamber may be a translucent plastic tube which includes disposable mixing elements. The length and diameter of this tube would vary depending upon the desired use of the dispenser by the operator.

Figure 4:
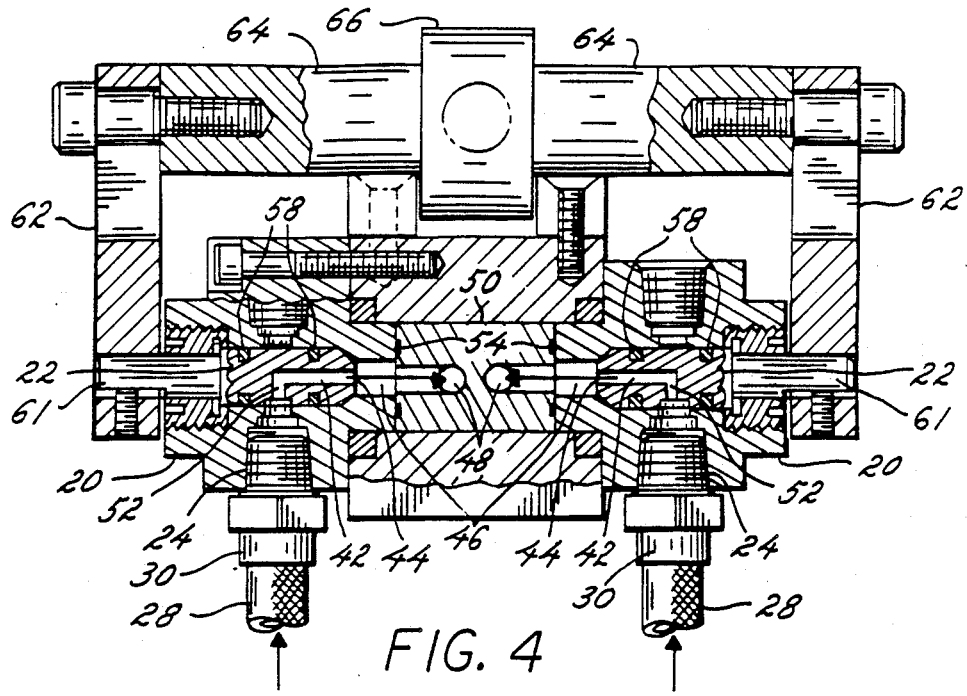
FIG. 4 is a cross-sectional view taken along the line 4—4 of FIG. 3, which further illustrates the internal construction of the valves and passageways in the dispenser.

As best shown in FIGS. 4, 6 and 7, it is a feature of the dispenser of this invention that when the valves 22 are in position to emit either fluid components or compressed gas, the inlets 52 are nearly coterminuous with the ends of the couplings 30 and 34. Due to the single passageway 42 on each valve, the compressed gas travels in the identical path that the foam components travel while in the dispenser. Preferably the distance between the point where either the foam components or compressed gas are introduced into the dispenser and the point where they enter the valves is short, so that a more complete cleaning of the gun can be achieved.

In the illustrated form, the valves are grooved to receive O-rings 58, as best seen in FIG. 4, on which the valves are slidably mounted in a fluid-sealed relation with bosses 20. The bosses also have additional ports 60 (FIGS. 6 and 7), which are filled with a lubricant, such as petroleum jelly or dioctylphthlate (dop), and are plugged to allow the lubrication of the valves 22. The valve seats should desirably be made of a durable material so that the frequency of replacement can be minimized. Many suitable materials are known, with polytetrafloroethylene resins being preferred.

A further feature of the dispenser of the present invention is its ability to deliver a predetermined amount of expanded foam. This feature is important when the foam is being introduced into a confined region, such as a refrigerator shell, where the operator wants to introduce neither too much nor too little foam, but wants to precisely fill the volume of the region. To this end, the valve inlets 52 are aligned with ports 24 for only the amount of time sufficient to allow the components needed to make the required volume of foam into the mixing chamber 16 via center plug 50. After this time has elapsed, the inlets 52 move out of alignment with the ports 24, and no additional components are allowed to enter the center plug 50. Thus, means are provided for moving all valves in unison between the position in which they communicate with the foam component carrying tubes and the position in which they communicate with the compressed gas carrying tubes.

In the preferred embodiment, each valve 22 has a valve stem 61, best seen in FIG. 4, which extends out from the boss 20 and is keyed to be held for rotation by one end of each lever arm 62. The other end of each lever arm 62 is connected by an extension 64 to the rod 66 of a double-acting gas cylinder or piston 68 (FIG. 1) which is rigidly affixed to the foam dispenser 10 through an L-shaped bracket 70. The lever arms 62 are slotted to compensate for the straight line movement of piston rod 66. The movement of the piston rod 66 rotates the valves 22 in unison between the position in which foam components are allowed to enter the foam dispenser, when the piston rod 66 is in its extended position (shown in FIGS. 3 and 7), and the position in which the compressed gas is admitted to the foam dispenser, when the piston rod 66 is in its retracted position (shown in FIGS. 2 and 6).

The piston 68 provides timed actuating means for the valve and is actuated by the manipulation of a trigger switch 72 (FIG. 2), which is located in the handle 12. When manipulated, the trigger 72 feeds either a gas diverter valve or an electric control circuit which emits gas to the left-hand side of the piston, extending the piston rod 66 to move the valve 22 in unison into position to emit foam components (FIG. 3). After being in such a position for the amount of time required to introduce the amount of foam components required to make the desired volume of expanded foam, the piston rod 66 is automatically retracted by introducing gas to the right-hand side of the piston to bring the valves 22 in unison into position to admit the compressed gas (FIG. 2) and thus clean the foam dispenser of all foam components to prevent the dispenser from becoming clogged.

In the preferred embodiment, trigger 72 is connected to a commercially available low voltage switch cord. The switch cord is connected to a commercially available timer which has thumb wheels on its front for varying the time of each dispensing sequence between 0.1 and 99.9 seconds. The timer also has an LED display which shows the time remaining before gas is admitted to right-hand side of the piston to retract the piston rod 66 and, thus, rotate the valves 22 so that no foam components are introduced into the gun. By knowing the volume of the container to be filled, the flow rate of the foam components into the gun, and the expansion rate of the combined components, the operator can set the timer so that the volume of the expanded foam generated by the gun precisely fills the container. After the timer is set, any number of identical size containers can be filled to the desired level by simply pulling the trigger 72 to initiate the timing sequence.

In accordance with the invention, and as disclosed herein, the center plug contains discrete passages for each foam component, and allows for the cleaning of the dispenser by the use of compressed gas. Since the foam components do not react inside the barrel of the dispenser, the dispenser may also be easily disassembled and cleaned. The mixing chamber may be permanent and cleaned mechanically, or may be disposable and discarded when it can no longer be cleaned with compressed gas.

I claim as my invention:

1. A foam dispenser for converting a plurality of foam components into an expanded foam and having means for cleaning the dispenser with compressed gas after the foam is discharged therefrom comprising, in combination:
    (a) a barrel having a plurality of passages formed therein which communicate with a center plug, the center plug having discrete passages for each of said foam components;
    (b) a mixing chamber connected to the center plug, the mixing chamber being located outside the barrel;
    (c) a nozzle connected to the mixing chamber and having a bore therethrough, one end of said bore communicates with the mixing chamber, while the other end provides an opening for discharging the expanded foam from the dispenser;
    (d) a tube for carrying each foam component to the dispenser, each such tube having a corresponding tube for carrying the compressed gas to the dispenser;
    (e) a rotary valve component for each pair of foam component and compressed gas tubes, each such valve having a single passageway formed therethrough with an inlet and an outlet, each valve being mounted for movement on the barrel so that the inlet of each valve is rotatable between positions nearly coterminous with the outlets of the foam component tubes and the compressed gas tubes, and the outlet of valve remains in communication with a passageway of the center plug; and (f) means for moving all valves in unison between communication with the foam component carrying tubes and communication with the compressed gas carrying tubes so that after the foam components have been mixed and the expanded foam discharged from the dispenser, the dispenser can be cleaned with the compressed gas from the point where the foam components enter the dispenser to the point where the foam components enter the mixing chamber.

2. The foam dispenser of claim 1 in which the valves are moved by timed actuating means so that the inlet of each valve is in communication with its foam component carrying tube only for a period of time sufficient to allow the entry of components into the mixing chamber via the center plug to make a predetermined amount of expanded foam.

3. The foam dispenser of claim 2 in which the timed actuating means comprises a double acting gas cylinder whose piston rod is connected by lever arms to each valve and activated by manipulation of a trigger switch located in the handle which is attached to the barrel.

4. The foam dispenser of claim 3 in which manipulation of the trigger switch feeds a gas diverter valve to activate the gas cylinder.

5. The foam dispenser of claim 3 in which the manipulation of the trigger switch signals an electric control circuit to activate the gas cylinder.

6. The foam dispenser of claim 1 in which the center plug is rectangular in shape.

7. The foam dispenser of claim 1 in which the mixing chamber is detachable from the center plug.

8. The foam dispenser of claim 7 in which the mixing chamber is disposable.

9. The foam dispenser of claim 1 in which the mixing chamber comprises a plastic tube containing mixing elements.

10. The foam dispenser of claim 9 in which the mixing chamber is translucent.

11. The foam dispenser of claim 1 in which the compressed gas tubes communicate with the rotary valve components via a pipe tee, said pipe tee comprising:

(a) a check valve situated at the interface of the pipe tee and the compressed gas tubes; and (b) a one-way valve means situated on the opposite end of the pipe tee from the check valve for supplying a cleaner into the pipe tee to clean the passageways of the dispenser and to seal out atmospheric moisture.

12. A method of converting a plurality of foam components into an expanded foam in a dispenser including a barrel having a plurality of passages formed therein which communicate with a center plug, the center plug having discrete passages for each of said fluid components, a mixing chamber connected to the center plug, the mixing chamber being located outside the barrel, a nozzle connected to the mixing chamber and having a bore therethrough, one end of the bore communicates with the mixing chamber while the other end provides an opening for discharging the expanded foam from the dispenser, a tube for carrying each foam component to the dispenser, each such tube having a corresponding tube for carrying a compressed gas to the dispenser, a rotary valve component for each pair of foam component and compressed gas tubes, each such valve having a single passageway formed therethrough with an inlet and an outlet, each valve being mounted for movement on the barrel so that the inlet of each valve is rotatable between positions nearly coterminous with the outlets of the foam component tubes and the compressed gas tubes, and the outlet of the valve remains in communication with the passageway of the center plug, and means for moving all valves in unison between communication with the foam component carrying tubes and communication with the compressed gas carrying tubes, the method comprising the steps of admitting the foam components into the center plug through the valves, passing the foam components through the discrete passageways in the center plug into the mixing chamber, reacting the components in the mixing chamber to form expanded foam, and discharging the expanded foam from the dispenser so that after the foam components have been mixed and the expanded foam discharged from the dispenser, the dispenser can be cleaned with the compressed gas from the point where the foam components enter the dispenser to the point where the foam components enter the mixing chamber.

* * * * *